(12) United States Patent
Ito et al.

(10) Patent No.: US 7,912,010 B2
(45) Date of Patent: Mar. 22, 2011

(54) WIRELESS CONNECTION TERMINAL AND ROAMING METHOD FOR PROVIDING STABLE WIRELESS CONNECTION TO ACCESS POINT

(75) Inventors: Yasuyuki Ito, Fukushima-ken (JP); Yuzuru Kawamura, Fukushima-ken (JP); Yuji Yanagisawa, Fukushima-ken (JP)

(73) Assignee: Alps Electronic Co., Ltd., Tokyo (JP)

( * ) Notice: Subject to any disclaimer, the term of this patent is extended or adjusted under 35 U.S.C. 154(b) by 744 days.

(21) Appl. No.: 11/870,389

(22) Filed: Oct. 10, 2007

(65) Prior Publication Data
US 2008/0089276 A1    Apr. 17, 2008

(30) Foreign Application Priority Data

Oct. 13, 2006  (JP) ................................. 2006-280123
Dec. 6, 2006   (JP) ................................. 2006-329045

(51) Int. Cl.
H04W 4/00        (2009.01)
(52) U.S. Cl. ...................................... 370/331; 445/436
(58) Field of Classification Search .......... 370/328–333; 455/436–444
See application file for complete search history.

(56) References Cited

U.S. PATENT DOCUMENTS

| 6,363,260 | B1  |   | 3/2002  | Achour et al. |
| 6,940,843 | B2  | * | 9/2005  | Goodall et al. ............... 370/338 |
| 7,509,129 | B2  | * | 3/2009  | Sinivaara ...................... 455/453 |
| 2002/0150063 | A1 | * | 10/2002 | Tran .............................. 370/332 |
| 2007/0037584 | A1 | * | 2/2007  | Um ............................ 455/456.1 |

FOREIGN PATENT DOCUMENTS

JP          2001-94572           4/2001

* cited by examiner

*Primary Examiner* — Ricky Ngo
*Assistant Examiner* — Gary Mui
(74) *Attorney, Agent, or Firm* — Beyer Law Group LLP

(57) ABSTRACT

A control unit of a wireless connection terminal compares the received signal strength indicator of an access point currently connected to by the wireless connection terminal with the received signal strength indicator of a neighboring access point. If the difference between the two received signal strength indicators is higher than or equal to 40%, the connection to the current access point is severed and roaming in which the connection is switched to the neighboring access point is performed. Even when the difference between the two received signal strength indicators is not higher than or equal to 40%, roaming in which the connection is switched to the neighboring access point is performed if the received signal strength indicator of the access point to which the wireless connection terminal is currently connected becomes lower than or equal to 20%.

12 Claims, 4 Drawing Sheets

WIRELESS CONNECTION TERMINAL AND ROAMING METHOD FOR PROVIDING STABLE WIRELESS CONNECTION TO ACCESS POINT

CLAIM OF PRIORITY

This application claims benefit of the Japanese Patent Application No. 2006-280123 filed on Oct. 13, 2006, and Japanese Patent Application No. 2006-329045 filed on Dec. 6, 2006, which are hereby incorporated by reference.

BACKGROUND OF THE INVENTION

1. Field of the Invention

The present invention relates to a wireless connection terminal and a roaming method for wirelessly communicating data by establishing a connection to an access point in a wireless network, such as a wireless LAN, and, in particular, to a roaming technology for use in a wireless network environment.

2. Description of the Related Art

In a wireless network environment, such as a wireless local area network (a wireless LAN), terminals are connected to the network via an access point installed in a public space or stores. Access points allow wireless connection terminals having a wireless communication function to connect thereto wirelessly. That is, data communication between the access point and the wireless connection terminals is performed by radio waves. However, the communication coverage area of one access point is limited. Accordingly, in general, in order to provide a wider wireless network environment, the communication coverage areas of a plurality of access points are disposed so as to be adjacent to each other (or partially overlapped).

In such a wide wireless network environment, a wireless connection terminal may move from the communication coverage area of an access point into the communication coverage area of another access point. For example, when a mobile information device is connected to a wireless LAN using a wireless module or when a laptop mobile personal computer is connected to a wireless LAN using a wireless communication adaptor, this situation occurs. In such a case, roaming is performed in which the wireless connection terminal selectively switches connection from the currently connected access point to another access point as the wireless connection terminal moves.

Roaming is a sequence in which the connection to the current access point is severed and, subsequently, connection to the next access point is established. To provide high-speed roaming, hopping information from the access point to which a station (a wireless connection terminal) is connected to another access point may be retrieved and downloaded. Thereafter, when the beacon quality of the access point to which the station is currently connected becomes less than or equal to a predetermined threshold value, an access point having the highest received signal strength indicator (RSSI) is selected for roaming on the basis of the downloaded information (refer to, for example, Japanese Unexamined Patent Application Publication No. 2001-94572 and, in particular, FIG. 1).

However, in the technology described in Japanese Unexamined Patent Application Publication No. 2001-94572, if the wireless connection terminal moves forward and backward across a threshold value boundary of the connected access point so that the RSSI of the connected access point unstably varies above and below the threshold value, roaming is performed every time the RSSI becomes lower than or equal to the threshold value. Thus, the communication is frequently disrupted.

In addition, in the technology described in Japanese Unexamined Patent Application Publication No. 2001-94572, roaming is performed when the RSSI of the access point is decreased to a value less than or equal to threshold value. Accordingly, if the threshold value is set to an extremely low value, the wireless connection tends to be unstable before and after roaming is performed. Furthermore, the communication is frequently disrupted due to the frequent roaming operations. Thus, the communication before and after roaming is performed tends to be incomplete.

SUMMARY OF THE INVENTION

The present invention provides a wireless connection terminal and a roaming method of wireless communication in which excellent roaming can be performed.

According to an embodiment of the present invention, in a wireless connection terminal and a roaming method of wireless communication, the wireless connection terminal detects the received signal strength indicators of the currently connected access point and the connectable access points in a wireless network, and compares the received signal strength indicator of the currently connected access point with that of each of the connectable access points. If one of the received signal strength indicators of the connectable access points is higher than that of the currently connected access point by a difference of a predetermined percentage, roaming in which the connection is switched from the currently connected access point to the connectable access point is performed. In this way, the above-described problem is solved.

According to the embodiment of the present invention, for example, two adjacent access points are provided in a wireless network. The communication coverage areas of the two adjacent access points partially overlap. In general, the received signal strength of an access point decreases as the wireless communication terminal moves away from the access point. Accordingly, as the wireless communication terminal moves from the currently connected access point to the other adjacent access point, the received signal strength of the currently connected access point gradually decreases. However, in an area where the communication coverage areas of the two adjacent access points overlap, the received signal strength of the other adjacent access point gradually increases as the wireless communication terminal moves.

In such a situation, the magnitude relation between the two signal strengths is finally reversed. If the reception signal strength of the other adjacent access point becomes higher than that of the currently connected access point, the radio wave signal from the other neighboring access point may interfere with the radio wave signal from the currently connected access point. Therefore, according to the present invention, when the received signal strength of the other access point is higher than that of the currently connected access point by a difference of a predetermined percentage, the connection to the current access point is severed and is switched to the other access point. That is, roaming is performed. Thus, unlike the above-described related art in which roaming is not performed until the received signal strength of the currently connected access point is decreased to a predetermined threshold value, if another access point having a received signal strength higher than that of the currently connected access point by a certain value, the connection is switched to that access point. In this way, roaming can be performed early so as to obtain more suitable conditions. In addition, the interference with the radio wave signal from the other neighboring access point having a received signal strength higher than that of the currently connected access point by a certain value can be prevented. Accordingly, further suitable conditions of connection to the wireless network can be provided.

However, the received signal strength in wireless communication varies depending on a variety of conditions that determine the incoming signal strength, such as the presence/absence of an obstacle or a building. Accordingly, even when the wireless connection terminal moves in an area where the communication coverage areas of the two adjacent access points overlap or in the vicinity of this overlap area, the situation does not always occur in which the received signal strength of the other adjacent access point is higher than that of the currently connected access point by a difference of more than or equal to a predetermined percentage. Therefore, according to the present invention, even when the received signal strength of the other adjacent access point is not higher than that of the currently connected access point by a difference of more than or equal to a predetermined percentage while the wireless connection terminal is moving, roaming in which the connection is switched from the currently connected access point to the other adjacent access point is performed if the received signal strength of the currently connected access point decreases to a value lower than or equal to a predetermined percentage of the maximum value thereof.

Consequently, when the received signal strength of the currently connected access point decreases to a value lower than or equal to a predetermined percentage of the maximum value thereof (i.e., a threshold value), roaming is performed in order to prevent the wireless connection from being unstable. In this way, by performing appropriate roaming, an excellent wireless connection state can be maintained at all times.

According to the present invention, the following roaming condition can be employed. That is, the received signal strength of the currently connected access point is compared with the received signal strength of the other adjacent access point. If the received signal strength of the other adjacent access point is higher than that of the currently connected access point by a difference of more than or equal to 40%, roaming is performed. However, according to the present invention, the difference may be changed in some range. More specifically, the minimum value of the difference between the received signal strength indicators of the two access points that determines the roaming condition can be set to 40%. The difference may be a value higher than the minimum value (e.g., 45% or more, or 50% or more).

When the received signal strength of the other adjacent access point is higher than that of the currently connected access point by any set difference value (more than or equal to 40%), roaming in which the connection is switched from the current access point to an access point having a higher received signal strength is performed early.

In addition, if the above-described condition is not satisfied, it is determined whether the received signal strength of the currently connected access point is lower than or equal to 20% of the maximum value thereof. If the received signal strength of the currently connected access point is lower than or equal to 20% of the maximum value thereof, the connection to the currently connected access point may be severed and, subsequently, the wireless connection terminal may roam to the other access point.

In this case, before the received signal strength of the currently connected access point reaches a very low value, the connection is switched to the other access point when the received signal strength of the currently connected access point is 20% of the maximum value thereof. Accordingly, the connection to the access point is prevented from being unstable, and high-speed roaming can be performed.

According to a wireless connection terminal and a roaming method of wireless communication of the present invention, roaming is performed on the basis of not only a threshold value, but also a comparison result between the received signal strength indicators of the currently connected access point and the newly connected access point. Thus, roaming is performed under optimum conditions at all times.

DESCRIPTION OF THE PREFERRED EMBODIMENTS

Figure 1:
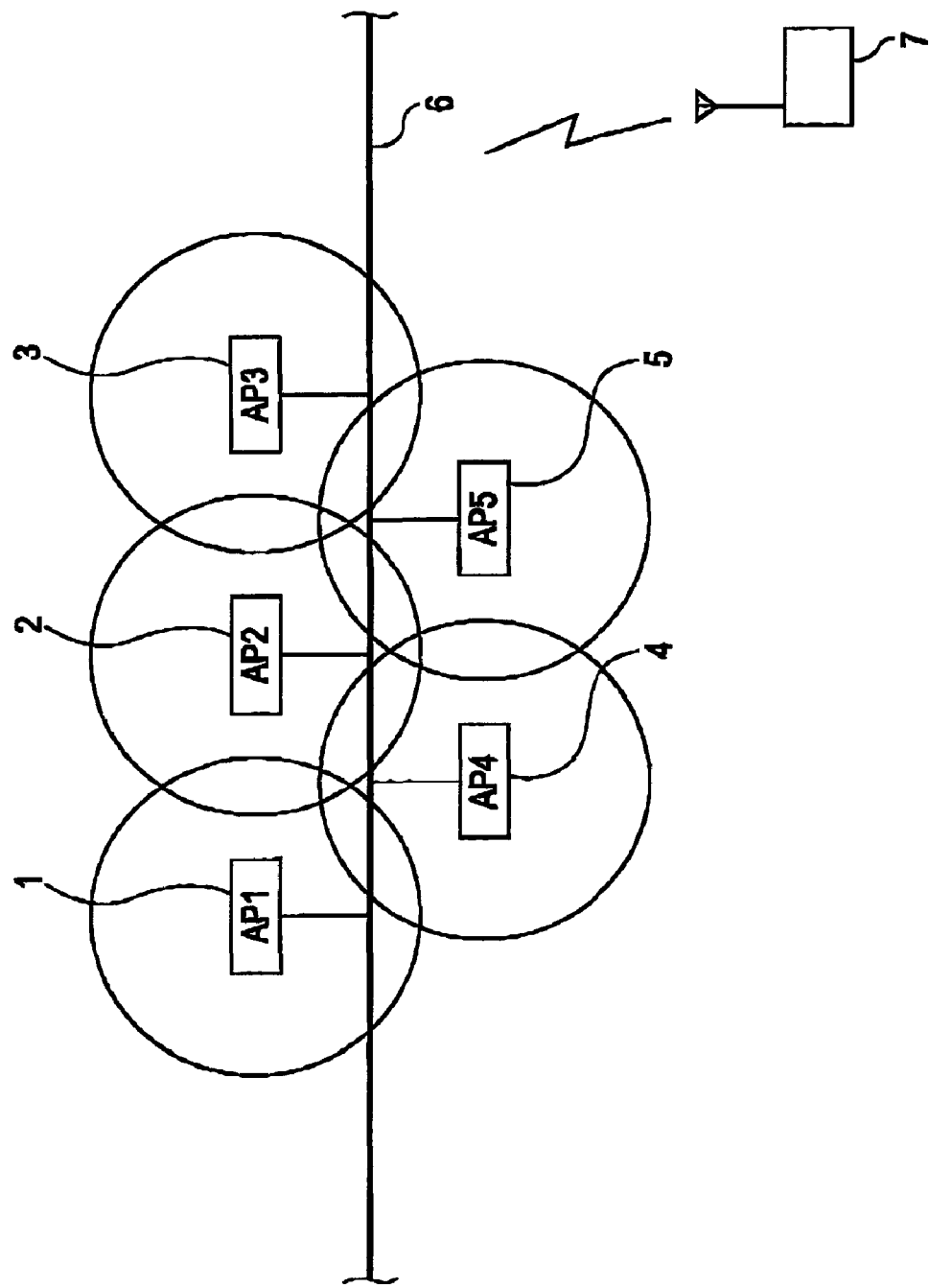
FIG. 1 is a schematic illustration of a wireless network in which a wireless connection terminal performs wireless communication.

Exemplary embodiments of the present invention are described in detail below with reference to the accompanying drawings. FIG. 1 is a schematic illustration of a wireless network to which a wireless connection terminal 7 is connected through wireless communication according to an embodiment of the present invention. This wireless network provides a wireless network environment, such as a wireless local area network (LAN). The wireless network includes a plurality of access points 1 to 5 that relay wireless communication. The wireless network further includes a network 6 that transmits information received and transmitted from and to the access points 1 to 5 through wireless communication.

The network 6 is a network infrastructure that provides a wired network environment, such as Ethernet (registered trade name). A wireless connection terminal 7 includes a wireless terminal adaptor. Examples of the wireless connection terminal 7 include a mobile station, a mobile information device, and a laptop personal computer capable of wirelessly communicating with one of the access points 1 to 5 while moving in the wireless network environment. In addition to the access points 1 to 5, a variety of network devices (e.g., a server, a client station, a network printer, a network scanner, and a digital multi-function peripheral) (not shown) are connected to the network 6.

Figure 2:
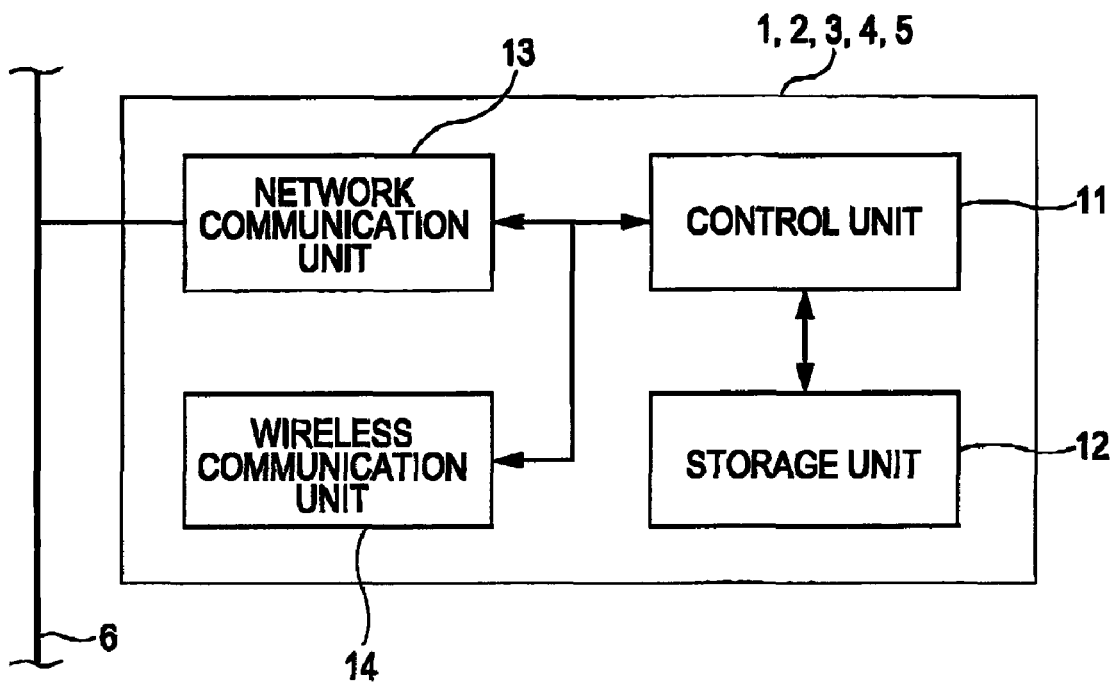
FIG. 2 is a schematic illustration of an exemplary configuration of an access point.

FIG. 2 is a schematic illustration of an exemplary configuration of each of the access points 1 to 5. Each of the access points 1 to 5 has a function of a bridge between the network 6 and the wireless connection terminal 7. Each of the access points 1 to 5 includes a control unit 11, a storage unit 12, a network communication unit 13, and a wireless communication unit 14. The control unit 11 has a function of controlling the operations of the other units. For example, the control unit 11 is a central processing unit (CPU) mounted on a circuit board (not shown).

The storage unit 12 stores a variety of data or updates the data in response to an instruction received from the control unit 11. For example, the storage unit 12 is a memory device, such as a read only memory (ROM) mounted on a circuit board (not shown). The network communication unit 13 can transmit data sent from the wireless connection terminal 7 via the network 6 and receive data sent to the wireless connection terminal 7 via the network 6.

In FIG. 1, circles, the centers of which are the access points 1 to 5, represent areas where the wireless connection terminal 7 can wirelessly communicate with the access points 1 to 5, for example, a communication coverage area having a radius of from a few tens of meters to a few hundreds of meters.

Figure 3:
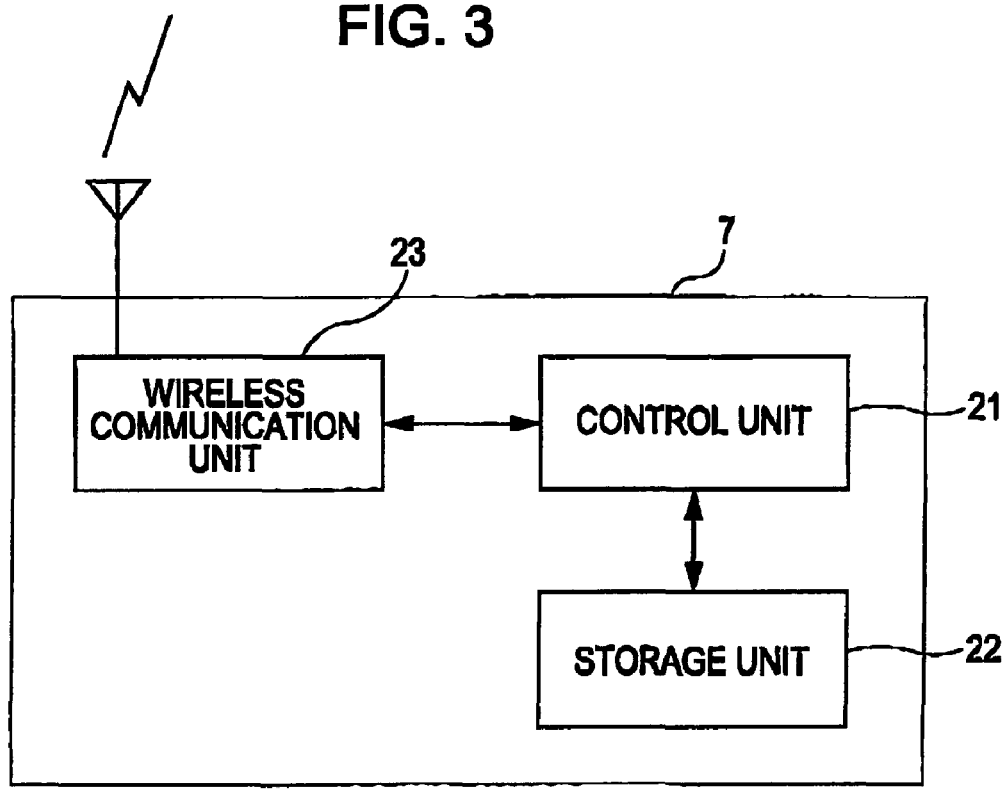
FIG. 3 is a schematic illustration of an exemplary configuration of the wireless connection terminal.

FIG. 3 is a schematic illustration of an exemplary configuration of the wireless connection terminal 7. The wireless connection terminal 7 includes a control unit 21, a storage unit 22, and a wireless communication unit 23. The control unit 21 has a function of controlling the operations of the other units. For example, the control unit 21 is a CPU mounted on a circuit board (not shown).

The storage unit 22 is a memory device, such as a ROM, mounted on a circuit board (not shown). The storage unit 22 stores data transmitted from the access points 1 to 5 through wireless communication. In addition, the storage unit 22 stores a variety of programs including application programs executed by the control unit 21.

The wireless communication unit 23 transmits data stored in the storage unit 22 to one of the access points 1 to 5 and receives data transmitted from one of the access points 1 to 5 through wireless communication.

The control unit 21 executes programs including application programs stored in the storage unit 22 so as to perform a roaming process that changes the connected access point of wireless communication. The roaming process is performed when, for example, the wireless connection terminal 7 is connected to an access point 1, which is one of the access points, and moves towards an access point 2, which is adjacent to the access point 1, in the network environment. The roaming process performed by the control unit 21 of the wireless connection terminal 7 according to the present embodiment is described in detail below. In the following description, a roaming process from the access point 1 to the access point 2 is described. However, a roaming process according to the present embodiment is not limited thereto.

Figure 4:
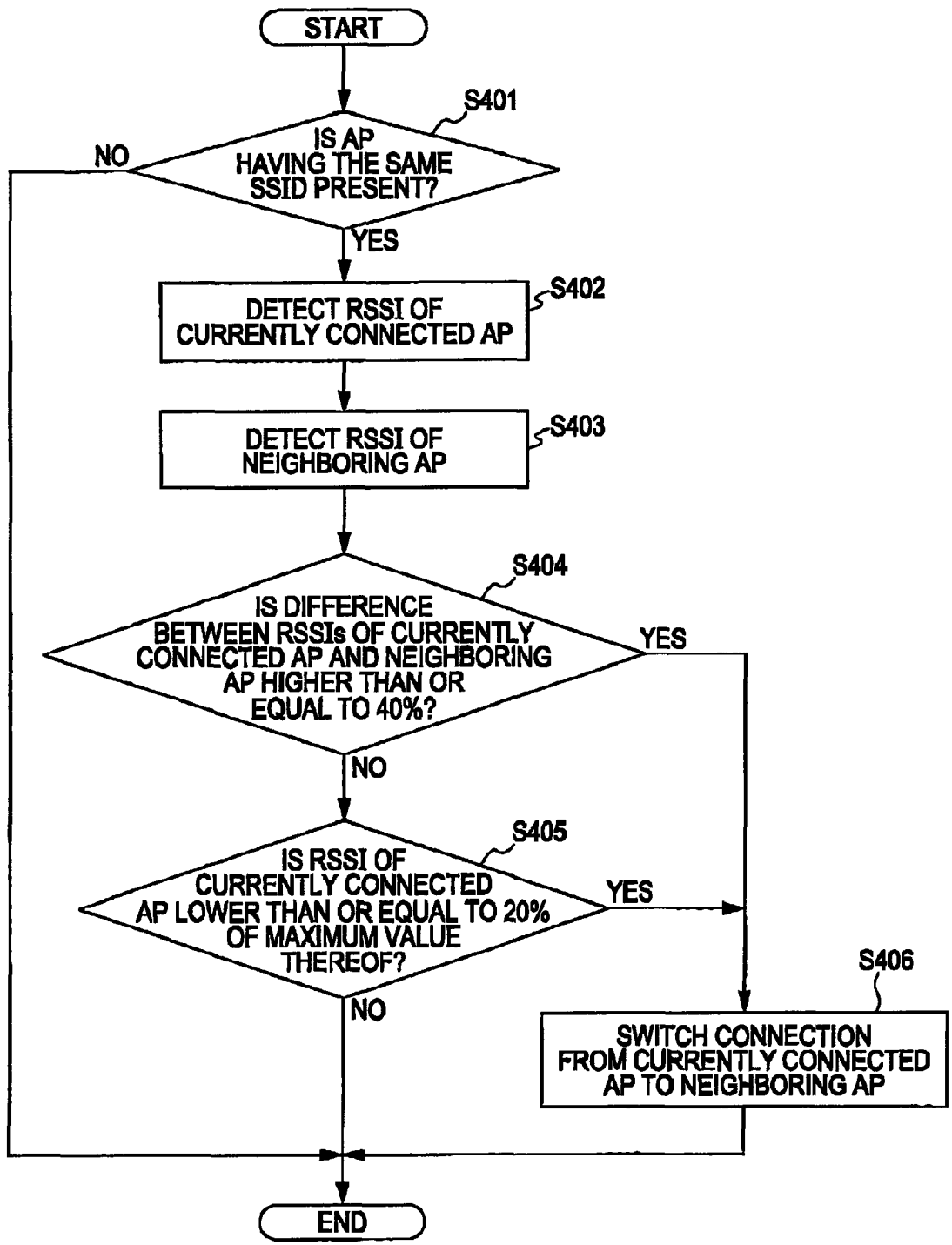
FIG. 4 is a flow chart of a roaming process performed by a control unit of the wireless connection terminal.

FIG. 4 is a flow chart of the roaming process performed by the control unit 21 of the wireless connection terminal 7. An example of the roaming process is described next with reference to the procedure shown by the flow chart.

At step S401, the control unit 21 determines whether an available access point other than the access point 1 to which the wireless connection terminal 7 is currently connected and adjacent to the access point 1 is present. The control unit 21 performs a scan operation using, for example, a service set ID (SSID) that is the same as that of the wireless connection terminal 7. The SSID is defined by the IEEE802.3 standard. Thus, the control unit 21 detects an adjacent access point having the communication coverage area that includes the current position of the wireless connection terminal 7. It the control unit 21 cannot detect another access point ("No" at step S401), the control unit 21 completes the roaming process. However, if the control unit 21 can detect another access point ("Yes" at step S401), the control unit 21 determines that an access point having the same SSID is present. The processing then proceeds to step S402.

At step S402, the control unit 21 detects the received signal strength indicator (RSSI) of the access point 1 to which the control unit 21 is currently connected. In this example, the control unit 21 detects the received signal strength indicator of a beacon from the access point 1. The received signal strength indicator is defined as a ratio of the signal strength to the maximum transmission power of the access point 1, which is a known value. For example, the received signal strength indicator corresponding to the maximum value is defined as "100%". As the received signal strength decreases, the ratio (percentage) decreases.

At step S403, the control unit 21 detects the received signal strength indicator of the neighboring access point. In this example, it the access point 2 is detected as a result of the scan operation performed at step S401, the control unit 21 detects the received signal strength indicator of a beacon from the access point 2.

At step S404, the control unit 21 determines whether the received signal strength indicator of the access point 1, which is the currently connected access point, is different from the received signal strength indicator of the neighboring access point 2 by a difference of more than or equal to 40%. That is, the control unit 21 compares the received signal strength indicator detected at step S402 with the received signal strength indicator detected at step S403. Using the result of the comparison, the control unit 21 determines whether, for example, the received signal strength indicator of the access point 2 is higher than the received signal strength indicator of the access point 1 by a difference of more than or equal to 40%. If the control unit 21 determines that the received signal strength indicator of the access point 2 is higher than the received signal strength indicator of the access point 1 by a difference of more than or equal to 40% ("Yes" at step S404), the processing of the control unit 21 proceeds to step S406.

At step S406, the control unit 21 disconnects the connection to the access point 1 to which the wireless connection terminal 7 is currently connected. Concurrently, the control unit 21 changes the wireless connection from the access point 1 to the access point 2. In this way, roaming from the access point 1 to the access point 2 is performed.

However, if the control unit 21 determines that the received signal strength indicator of the access point 2 is not higher than the received signal strength indicator of the access point 1 by a difference of more than or equal to 40% ("No" at step S404), the processing of the control unit 21 proceeds to step S405.

At step S405, the control unit 21 determines whether the received signal strength indicator of the access point 1 to which the wireless connection terminal 7 is currently connected is less than or equal to 20% of the maximum value. If the received signal strength indicator of the access point 1 is not less than or equal to 20% of the maximum value thereof ("No" at step S405), the control unit 21 completes the roaming process.

However, if, at step S405, the control unit 21 determines that the received signal strength indicator of the access point 1 is less than or equal to 20% of the maximum value thereof ("Yes" at step S405), the processing of the control unit 21 proceeds to step S406. At step S406, as described above, roaming from the access point 1 to the access point 2 is performed.

Figure 5:
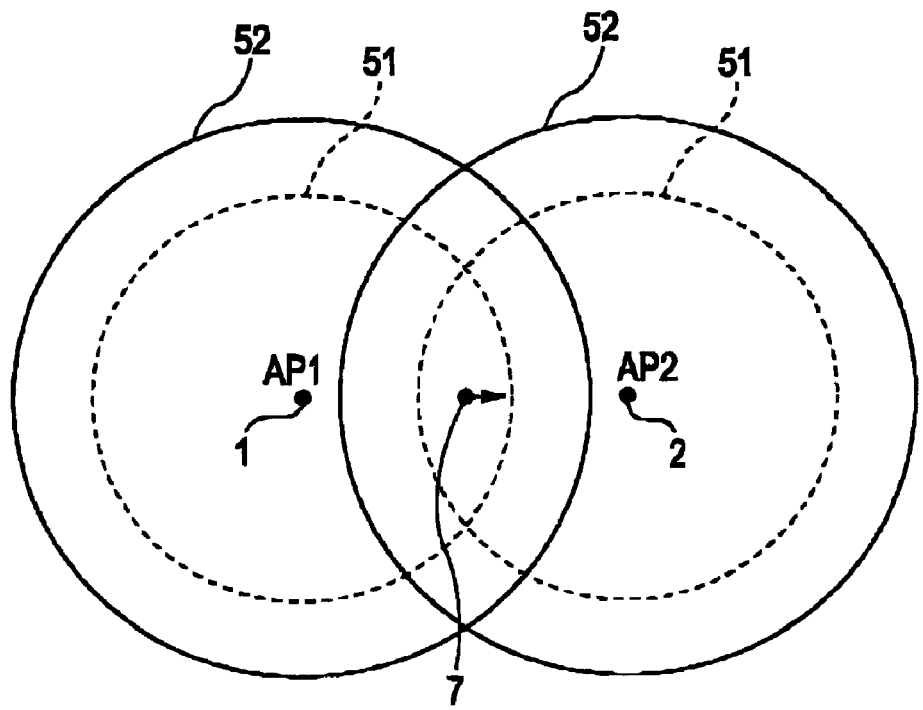
FIG. 5 is a schematic illustration of movement of the wireless connection terminal in a roaming example 1.
Figure 6:
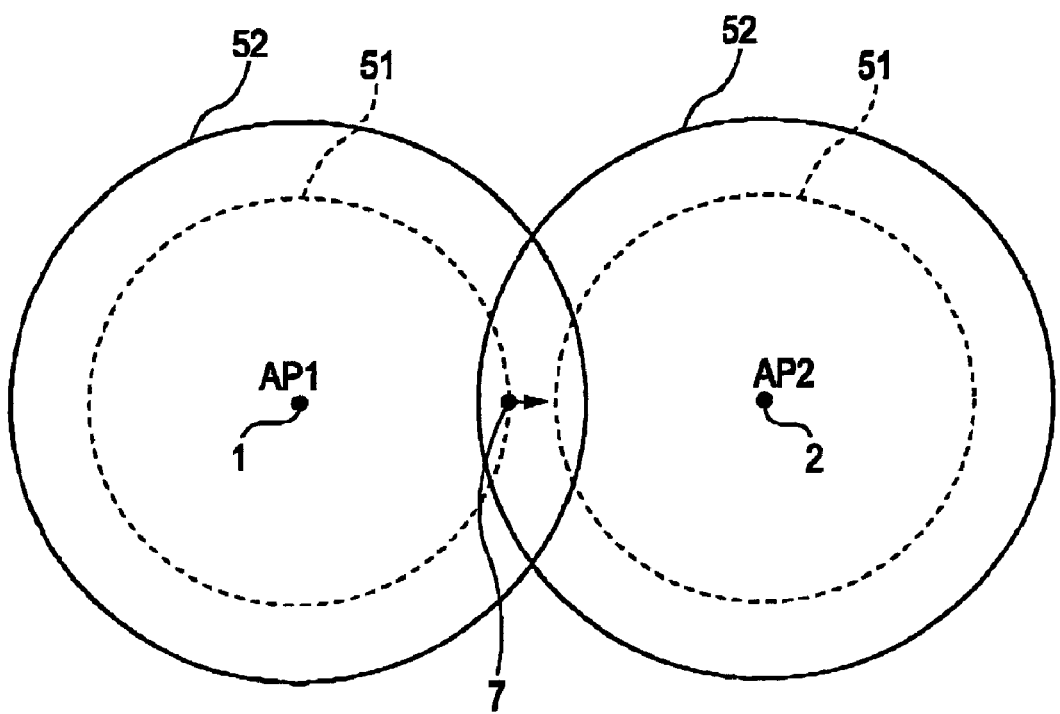
FIG. 6 is a schematic illustration of movement of the wireless connection terminal in a roaming example 2.

FIGS. 5 and 6 schematically illustrate the movement of the wireless connection terminal 7 which is currently connected to the access point 1 towards the adjacent access point 2. In FIGS. 5 and 6, the access point 1, the access point 2, and the wireless connection terminal 7 are simply represented by using symbols "*". In addition, in each of FIGS. 5 and 6, two pairs of concentric circles representing stable reception areas 51 and minimum reception areas 52 are shown. The center of one of the pairs is the access point 1 (represented by a reference symbol "AP1"). The center of the other pair is the access point 2 (represented by a reference symbol "AP2").

The contour (represented by a dotted line) of the stable reception area 51 corresponds to the threshold value of the received signal strength indicator. The threshold value determines the condition under which the connection to the access point 1 or the access point 2 is severed and a roaming operation is performed. In the present embodiment, the received signal strength indicator becomes 20% of the maximum value thereof on the contour of the stable reception area 51. The contour (represented by a solid line) of the minimum reception area 52 indicates the minimum value of the received signal strength indicator at which the communication between the wireless connection terminal 7 and the access point 1 or between the wireless connection terminal 7 and the access point 2 is disrupted. In an area outside the minimum reception area 52, the wireless connection terminal 7 cannot be connected to the access point 1 or the access point 2.

In the example shown in FIG. 5, the stable reception areas 51 of the access point 1 and the access point 2 partially overlap. In addition, the minimum reception areas 52 of the access point 1 and the access point 2 partially overlap. In contrast, in the example shown in FIG. 6, although the minimum reception areas 52 of the access point 1 and the access point 2 partially overlap, the stable reception areas 51 of the access point 1 and the access point 2 are separated from each other without overlapping. In the present embodiment, the following different roaming methods are employed for the conditions shown in FIGS. 5 and 6.

ROAMING EXAMPLE 1

In roaming example 1 shown in FIG. 5, the roaming conditions are satisfied at step S404. In roaming example 1, the wireless connection terminal 7 moves towards the access point 2 in an area where the stable reception areas 51 of the access point 1 and the access point 2 overlap. If the received signal strength indicator of the access point 2 becomes higher than that of the access point 1 by a difference of more than or equal to 40% during the movement, roaming is performed at step S406, as noted above.

For example, assume that while the wireless connection terminal 7 is moving, the received signal strength indicator of the access point 1 to which the wireless connection terminal 7 is currently connected is 25% of the maximum value, and the received signal strength indicator of the neighboring access point 2 is 65% of the maximum value. In such a case, when the received signal strength indicator of the access point 1 is compared with that of the access point 2 at step S404, it is determined that the received signal strength indicator of the access point 2 is higher than that of the access point 1 by a difference of more than or equal to 40%. Therefore, even when the wireless connection terminal 7 is located inside the stable reception area 51 of the access point 1, the roaming conditions are satisfied. Consequently, roaming in which the connection is switched to the access point 2 that provides a higher received signal strength indicator is performed.

As described above, in roaming example 1, roaming is performed in which the connection is switched from the access point 1 to which the wireless connection terminal 7 is currently connected to the access point 2 having a received signal strength indicator higher than that of the access point 1 early. Accordingly, failure of the reception of a radio wave signal is prevented from occurring, thus providing an excellent wireless connection state.

ROAMING EXAMPLE 2

In roaming example 2 shown in FIG. 6, the roaming conditions are satisfied at step S405 rather than at step S404. In roaming example 2, the wireless connection terminal 7 moves outwardly from the contour of the stable reception area 51 towards the access point 2. Since the wireless connection terminal 7 has not arrived at the stable reception area 51 of the access point 2, the received signal strength indicator of the access point 2 does not become higher than that of the access point 1 by a difference of more than or equal to 40% during the movement. However, when the wireless connection terminal 7 exits the stable reception area 51 of the access point 1, it is determined at step S405 that the received signal strength indicator of the access point 1 to which the wireless connection terminal 7 is currently is lower than or equal to 20% of the maximum value. Accordingly, a roaming condition other than the above-described roaming condition is satisfied. Thus, roaming in which the connection is switched to the access point 2 is performed.

In roaming example 2, even if the received signal strength indicator of the adjacent access point 2 is not higher than that of the access point 1 by a difference of more than or equal to 40%, the connection is switched to the access point 2 when the received signal strength indicator of the access point 1 becomes lower than or equal to 20% of the maximum received signal strength indicator of the adjacent access point 1. Accordingly, the roaming process is reliably performed. In roaming example 2, the wireless connection terminal 7 moves towards the access point 2. Therefore, after roaming from the access point 1 to the access point 2 is performed, the received signal strength indicator of the access point 2 gradually increases as the wireless connection terminal 7 moves. Consequently, even when roaming is performed outside the stable reception area 51 of the access point 2, the wireless connection terminal 7 finally enters the stable reception area 51 of the access point 2. Thus, the wireless connection terminal 7 can receive a sufficient received signal strength indicator. As a result, roaming is performed under an excellent condition.

Although the present invention has been shown and described with reference to the foregoing embodiment, the present invention is not limited thereto. For example, while the foregoing embodiment has been described with reference to a roaming process in which the wireless connection terminal 7 connected to the access point 1 is switchingly connected to the access point 2, the same process as that of the foregoing embodiment can be applied to a roaming process in which roaming where the connection is switched from the access point 1 to any adjacent access point (e.g., from the access point 1 to the access point 4 or from the access point 2 to the access point 3) is performed.

In addition, in the foregoing embodiment, if a difference between the received signal strength indicator of the access point 1 and the received signal strength indicator of the access point 2 becomes higher than or equal to 40% in a comparison of step S404, the connection of the wireless communication is switched from the access point 1 to the access point 2. However, another percentage (e.g., a value in the range of from 40% to 60%) may be employed as the roaming condition.

Furthermore, in the foregoing embodiment, the maximum value of the received signal strength indicator is determined using the known maximum transmission powers of the access points 1 to 5. However, the maximum value may be determined using, for example, the received signal strength indicators at positions where the wireless connection terminal 7 is the closest to the access points 1 to 5. Alternatively, the maximum value may be determined to be the received signal strength indicator at the time when the wireless connection terminal 7 is connected to each of the access points 1 to 5 first.

Then, the roaming condition may be determined using a ratio of the received signal strength indicator to the maximum value (step S404 or S405).

Still furthermore, the configuration of the wireless network, the access points 1 to 5, and the wireless connection terminal 7 according to the foregoing embodiment are only exemplary, and various modifications and changes may be made without departing from the spirit and scope of the present invention.

What is claimed is:

1. A wireless connection terminal comprising:
wireless connection means for establishing a connection to one of a plurality of access points located in a wireless network through wireless communication;
first signal strength detecting means for detecting a reception signal strength of a signal from a first access point representing a current connection point connected to by the wireless connection means, the detected reception signal strength being defined as a first reception signal strength;
connection point detecting means for detecting one of the access points other than the first access point that is capable of being connected to the wireless connection means, the detected access point being defined as a second access point;
second signal strength detecting means for detecting a reception signal strength of a signal from the second access point detected by the connection point detecting means, the detected reception signal strength being defined as a second reception signal strength; and
connection point switching means for comparing the detected first and second reception signal strengths with each other and switching the connection point connected to by the wireless connection means from the first access point to the second access point when the second reception signal strength is greater than the first reception signal strength by a difference of more than or equal to a predetermined percentage of a maximum value of the first reception signal strength.

2. The wireless connection terminal according to claim 1, wherein the connection point switching means switches the connection point connected to by the wireless connection means from the first access point to the second access point when the second reception signal strength is greater than the first reception signal strength by a difference of more than or equal to 40% of the maximum value of the first reception signal strength on the basis of the comparison result.

3. The wireless connection terminal according to claim 1, wherein the maximum value of the first reception signal strength is determined based on one of:
a known maximum transmission power of the first access point;
the received signal strength at a position closest to the first access point; or
the received signal strength at time when the wireless connection terminal is first connected to the first access point.

4. A wireless connection terminal comprising:
wireless connection means for establishing a connection to one of a plurality of access points located in a wireless network through wireless communication;
first signal strength detecting means for detecting a reception signal strength of a signal from a first access point representing a current connection point, the detected reception signal strength being defined as a first reception signal strength;
connection point detecting means for detecting one of the access points other than the first access point that is capable of being connected to the wireless connection means, the detected access point being defined as a second access point;
second signal strength detecting means for detecting a reception signal strength of a signal from the second access point detected by the connection point detecting means, the detected reception signal strength being defined as a second reception signal strength; and
connection point switching means for comparing the detected first and second reception signal strengths detected with each other, and switching the connection point connected to by the wireless connection means from the first access point to the second access point when the second reception signal strength is greater than the first reception signal strength by a difference more than or equal to a first predetermined percentage of a maximum value of the first reception signal strength,
wherein the connection point switching means further switches the connection point connected to by the wireless connection means from the first access point to the second access point if the first reception signal strength reduces to a value less than or equal to a second predetermined percentage of the maximum value of the first reception signal strength even when the second reception signal strength is not greater than the first reception signal strength by a difference of more than or equal to the first predetermined percentage of the maximum value of the first reception signal strength.

5. The wireless connection terminal according to claim 4, wherein the connection point switching means switches the connection point connected to by the wireless connection means from the first access point to the second access point if the first reception signal strength reduces to a value less than or equal to 20% of the maximum value of the first reception strength even when the second reception signal strength is not greater than the first reception signal strength by a difference of more than or equal to the first predetermined percentage.

6. The wireless connection terminal according to claim 4, wherein the maximum value of the first reception signal strength is determined based on one of:
a known maximum transmission power of the first access point;
the received signal strength at a position closest to the first access point; or
the received signal strength at time when the wireless connection terminal is first connected to the first access point.

7. A roaming method of wireless communication comprising the steps of:
establishing a connection to one of a plurality of access points in a wireless network through wireless communication;
detecting a reception signal strength of a signal from a first access point representing a current connection point, the detected reception signal strength being defined as a first reception signal strength;
detecting one of the access points other than the first access point that is capable of being connected to, the detected access point being defined as a second access point;
detecting a reception signal strength of a signal from the detected second access point, the detected reception signal strength being defined as a second reception signal strength; and
comparing the detected first and second reception signal strengths with each other and switching the connection point of the wireless communication from the first access point to the second access point when the second reception signal strength is greater than the first reception signal strength by a difference of more than or equal to a predetermined percentage of a maximum value of the first reception signal strength.

8. The roaming method of wireless communication according to claim 7, wherein, in the step of switching the connection point of the wireless communication from the first access point to the second access point, the first access point is switched to the second access point when the second reception signal strength is greater than the first reception signal strength by a difference of more than or equal to 40% of the maximum value of the first reception signal strength on the basis of the comparison result.

9. The roaming method of wireless connection according to claim 7, wherein the maximum value of the first reception signal strength is determined based on one of:
   a known maximum transmission power of the first access point;
   the received signal strength at a position closest to the first access point; or
   the received signal strength at time when the wireless connection terminal is first connected to the first access point.

10. A roaming method of wireless communication comprising the steps of:
   establishing a connection to one of a plurality of access points in a wireless network through wireless communication;
   detecting a reception signal strength of a signal from a first access point representing a current connection point, the detected reception signal strength being defined as a first reception signal strength;
   detecting one of the access points other than the first access point that is capable of being connected to, the detected access point being defined as a second access point;
   detecting a reception signal strength of a signal from the detected second access point, the detected reception signal strength being defined as a second reception signal strength; and
   comparing the detected first and second reception signal strengths with each other and switching the connection point of the wireless communication from the first access point to the second access point when the second reception signal strength is greater than the first reception signal strength by a difference of more than or equal to a first predetermined percentage of a maximum value of the first reception signal strength, and further switching the connection point of the wireless communication from the first access point to the second access point if the first reception signal strength reduces to a value less than or equal to a second predetermined percentage of the maximum value of the first reception signal strength even when the second reception signal strength is not greater than the first reception signal strength by a difference of more than or equal to the first predetermined percentage of the maximum value of the first reception signal strength.

11. The roaming method of wireless communication according to claim 10, wherein, in the step of switching the connection point of the wireless communication from the first access point to the second access point, even when the second reception signal strength is not greater than the first reception signal strength by a difference of more than or equal to the first predetermined percentage, the first access point is switched to the second access point if the first reception signal strength reduces to a value less than or equal to 20% of the maximum value of the first reception strength.

12. The roaming method of wireless connection according to claim 10, wherein the maximum value of the first reception signal strength is determined based on one of:
   a known maximum transmission power of the first access point;
   the received signal strength at a position closest to the first access point; or
   the received signal strength at time when the wireless connection terminal is first connected to the first access point.

* * * * *